United States Patent [19]
Withey et al.

[11] Patent Number: 5,439,086
[45] Date of Patent: Aug. 8, 1995

[54] MECHANICAL CLUTCH

[75] Inventors: Michael M. Withey, Pearland; Rob G. Lucas-Dean, Houston, both of Tex.

[73] Assignee: Oceaneering International, Inc., Houston, Tex.

[21] Appl. No.: 165,381

[22] Filed: Dec. 10, 1993

[51] Int. Cl.[6] ............................................. F16D 7/00
[52] U.S. Cl. .................... 192/56 R; 192/108; 464/38
[58] Field of Search ............... 192/56 R, 56 L, 108; 464/38, 39

[56] References Cited

U.S. PATENT DOCUMENTS

| | | | |
|---|---|---|---|
| 1,683,715 | 9/1928 | Erban | 464/38 X |
| 2,927,672 | 3/1960 | Banner | 192/108 X |

FOREIGN PATENT DOCUMENTS

| | | | |
|---|---|---|---|
| 57-129952 | 8/1982 | Japan | 464/39 |
| 833768 | 4/1960 | United Kingdom | 464/38 |
| 642530 | 1/1979 | U.S.S.R. | 464/38 |

*Primary Examiner*—Richard M. Lorence
*Attorney, Agent, or Firm*—Kurt S. Myers

[57] ABSTRACT

The present invention is directed to a mechanical clutch which limits transmission of torque to a desired, predetermined maximum torque from a first clutch plate to a second clutch plate. More specifically, the mechanical clutch includes at least one stepper member, preferably three or more evenly spaced stepper members, which transmit the torque from a first clutch plate to a second clutch plate providing a desired maximum torque is not exceeded. However, if the desired maximum torque is exceeded, the stepper member will rotate and move between the clutch plates so that the torque to the second clutch plate does not exceed the desired maximum torque. The desired maximum torque is set by the axial force compressing the stepper member between the clutch plates and when the applied torque to the first clutch plate exceeds the desired torque, the stepper member will rotate between the clutch plates rather than transmit that torque to the second clutch plate.

13 Claims, 7 Drawing Sheets

MECHANICAL CLUTCH

The invention described herein was made in the performance of work under NASA Contract No. NAS9-18900 (HS80E344OM) and is subject to the provisions of Section 305 of the National Aeronautics and Space Act of 1958 (42 U.S.C. 2457).

FIELD OF THE INVENTION

The present invention is directed to a mechanical clutch which prevents a desired, predetermined torque from being exceeded and transmitted from one clutch plate to another clutch plate. The desired maximum torque of the mechanical clutch is set by an axial force which compresses at least one stepper member, preferably three or more evenly spaced stepper members, between the first clutch plate and the second clutch plate. When the applied torque to one clutch plate exceeds the desired maximum torque each stepper member, rather than transmitting the torque to a second clutch plate, will rotate between the clutch plates.

BACKGROUND OF THE INVENTION

Torque transmitters of the prior art have relied mainly on frictional coefficients for their operation. Whether the transmitters use frictional surfaces or plates, the frictional coefficients vary significantly with ambient conditions such as humidity and thus are imprecise or cannot be accurately calibrated to make certain that a predetermined torque is applied but not exceeded. The problem is accentuated in space due to the lack of oxygen, frictional coefficients may vary as much as 50% from their value on Earth.

U.S. Pat. No. 3,707,888 to Schottler discloses a variable speed transmission for transmitting torque to an output shaft at a substantially constant selected speed. Driving balls arranged in constant rolling frictional contact with pairs of inner and outer concentric and axially separate ball races. One pair of races is associated with an input shaft, and the other pair of races is associated with the output shaft. The driving balls and races engage along contact tracks defined on the races and balls to thereby transmit torque between the shafts at a speed ratio determined by the contact tracks. Control means adjusts the axial positioning of one pair of races within a selected range to infinitely vary the contact tracks and thereby vary the speed ratio. Pressure regulator means responds to differential twist torque between the shafts to maintain the balls and races in frictional rolling contact throughout said selected range of adjustment and vary the contact pressure between races and balls in proportion to the output torque.

U.S. Pat. No. 3,991,592 to Brems et al discloses a safety overload clutch wherein the driving and driven members are retained in driving relation by a primary roller on one of the members which is urged radially into a groove on the other member by an elastic flexible ring loaded by one or more secondary rollers on the one member positioned substantially diametrically opposite the primary roller. When the load on the driven member exceeds a predetermined value, the primary roller rolls out of its groove causing additional deflection of the flexure ring.

U.S. Pat. No. 4,667,525 to Schottler discloses variable speed frictional transmissions that basically depend on driving balls arranged in constant rolling frictional contact with a pair of inner and a pair of outer concentric and axially separable ball races are improved by the provision of (1) new speed control units for changing the relative positions of balls and races to produce desired speed changes and (2) new cam and roller units for maintaining the balls and races in forced contact even when the transmissions are under no-load conditions. The new transmissions are characterized by (A) outer and inner circular concave race tracks and (B) a simplified hydraulic feed-back control mechanism which displaces the outer control race only in the direction of speed increase, while its opposite displacement is actuated by torque forces plus spring pressure. In contrast to prior devices of their class, it is further disclosed that the transmissions (a) do not produce any gyratory forces at any speed of operation, (b) do not increase input torque requirements as output speed is decreased, (c) do not have parts that may get out of phase when the transmissions are under no-load condition and (d) have greater power capacity per unit size.

U.S. Pat. No. 4,926,715 to Hirt et al discloses a planetary gear train comprising at least two planetary gear sets arranged coaxially behind, and drivingly connected with, one another, of which one planetary gear set contains fewer, and the other planetary set more, planet gears and the planet gears and their bearings in both planetary gear sets are identically constructed.

SUMMARY OF THE INVENTION

The present invention is directed to a mechanical clutch which limits transmission of torque to a desired, predetermined maximum torque from a first clutch plate to a second clutch plate. More specifically, the mechanical clutch includes at least one stepper member, preferably three or more evenly spaced stepper members, which transmit the torque from a first clutch plate to a second clutch plate providing a desired maximum torque is not exceeded. However, if the desired maximum torque is exceeded, each stepper member will rotate and move between the clutch plates so that the torque to the second clutch plate does not exceed the desired maximum torque. The desired maximum torque is set by the axial force compressing each stepper member between the clutch plates and when the applied torque to the first clutch plate exceeds the desired torque, each stepper member will rotate between the clutch plates rather than transmit that torque to the second clutch plate.

DESCRIPTION OF THE PREFERRED EMBODIMENTS

The present invention is directed to a mechanical clutch which limits transmittal of torque to a determined, limited, maximum torque which is directly related to the axial force which compresses at least one stepper member between a first clutch plate and a second clutch plate. The juxtaposed faces of the clutch plates are mirror faces or are face-to-face, with each face having a circle, of the same diameter, of equally spaced and sized dimples. The contact elements of the stepper members are in the corresponding dimples in the faces of the clutch plates. Each stepper member operates in two modes: either in (i) a first mode when the torque is less than or equal to the maximum torque threshold due to the axial force compressing the stepper member between the clutch plates wherein the stepper member remains in the corresponding dimples and the applied torque from the first clutch plate is transferred to the responsive or second clutch plate and (ii) a second mode when the torque is greater than the maximum torque threshold due to the axial force compressing the stepper member between the clutch plate wherein the stepper member rotates and elements of each stepper member moves to the next dimple which prevents the greater torque from being transmitted to the responsive or second clutch plate.

Figure 1:
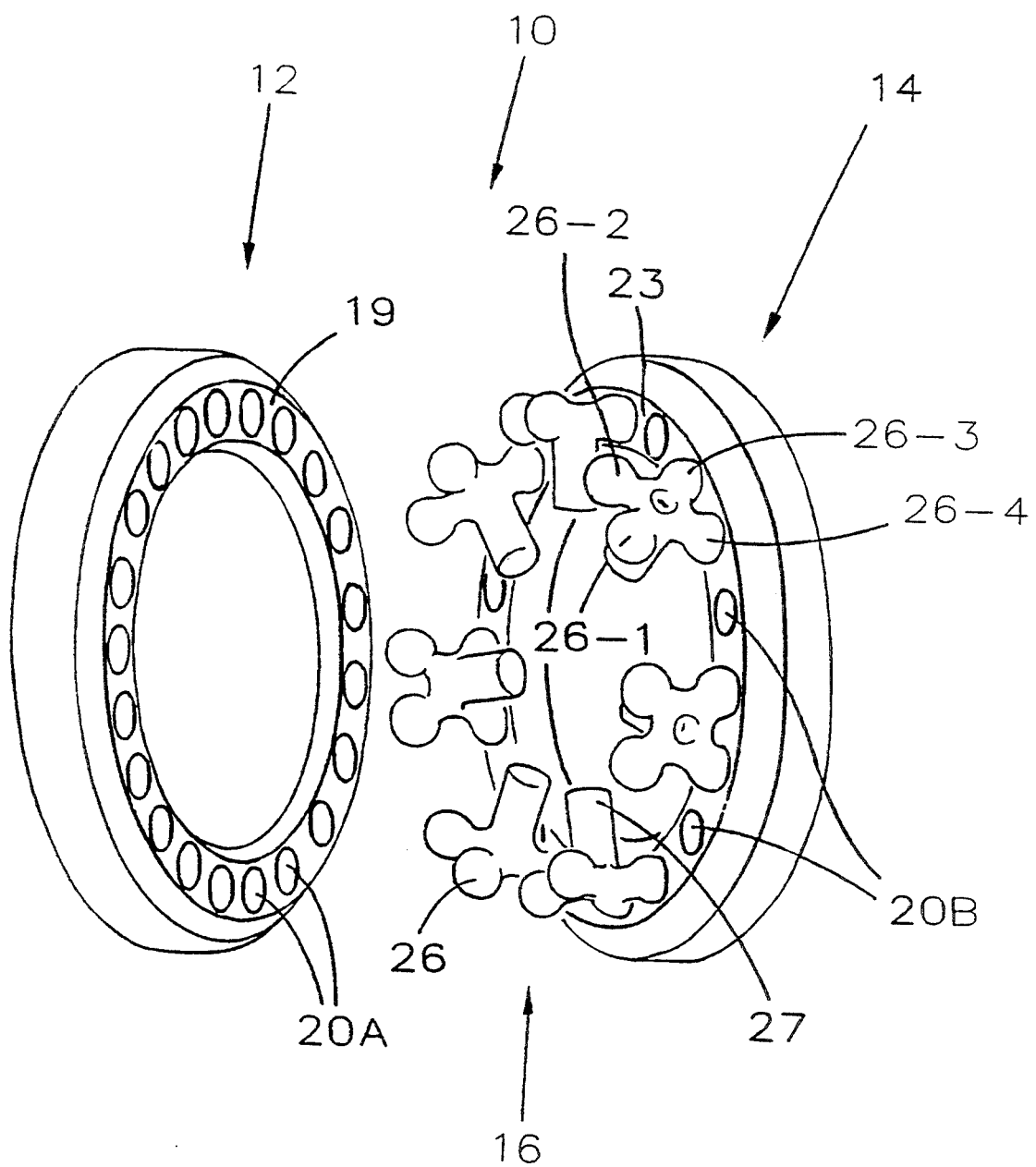
FIG. 1 is an exploded view showing only the essential elements of a mechanical clutch of the present invention, specifically showing only the face of a first clutch plate, the face of a second clutch plate and stepper members positioned between the faces of the first clutch plate and the second clutch plate.

Referring now to FIG. 1, the mechanical clutch 10 in this exploded view includes a first clutch plate 12, a second clutch plate 14 and stepper members 16. This exploded view includes all of the essential structure of a mechanical clutch 10 of the present invention; however, it does not disclose any specific structure for applying an applied torque to one of the clutch plates, structure for applying the axial force to compress the stepper members between the clutch plates, structure for adjusting the axial force which determines the maximum torque which will be transmitted or the housing for the mechanical clutch. It is understood that many alternative structures are possible to each of the foregoing specific functional structures. For example: the applied torque may be only in one direction or bi-directional; the structure for applying the axial force may be a spring system applying force against one or both clutch plates or may be pistons which are hydraulically operated or provided by magnetic forces; structure may be provided to adjust or change the axial force, rather than a fixed structure for a given axial force, such as structure to change the preload condition of a spring or piston; and the housing for the mechanical clutch will be adapted to each of the foregoing parameters, i.e. the source of the applied torque, the structure for providing the axial force and the structure which provides adjustments to the axial force, but in addition will be adapted to whether it houses only the mechanical clutch of the present invention or any other ancillary structure.

Because of the many variations of structure, FIG. 1 is useful to explain the operation of the mechanical clutch or torque transmitting device 10 of the present invention. Clutch 10 has a first clutch plate 12, a second clutch plate 14 and stepper members 16. For the purpose of describing the clutch 10 in FIG. 1, the first clutch plate 12 is considered the clutch having the applied torque or is the driven clutch plate. The face 19 of the clutch plate 12 has a plurality of equally spaced dimples 20A in a circle. The second clutch plate 14 has a juxtaposed face 23 to the face 19 of clutch plate 12. The face 23 of second clutch plate 14 has the same number and size of equally spaced dimples 20B in a circle of the same diameter as face 19 of the first clutch plate 12. Between the face 19 of the first clutch plate 12 and the face 23 of clutch plate 14 are the stepper members 16. The number of stepper members 16 shown in FIG. 1 is seven. The stepper members 16 each have a plurality of contact elements 26, preferably four as shown. The number of stepper members 16 determine the number of dimples in the respective faces 19 and 23 of clutch plates 12 and 14, respectively. A preferred number of dimples 20A or 20B in each face 19 or 23 shown is 21 (two for each contact element of each stepper member in contact with a clutch plate and one space between each stepper member $\{2\times 7+7=21\}$). Each stepper member 16 has a stabilizing leg 27 which is housed in a stabilizing ring (not shown in FIG. 1). Alternatively, each stepper member 16 may be held in alignment perpendicular to the axis of rotation of the clutch plates, by a ring placed outside the path of the steppers.

A structure which houses the mechanical clutch 10 including the two clutch plates 12 and 14 is not shown in FIG. 1 since several different structures are possible. For example, if the mechanical clutch of the present invention is used with a motor as the source of applied torque, a housing may be adapted to house the motor and the mechanical clutch of the present invention. An applied torque may be applied to either clutch plate, such as being powered by a motor or a hydraulic device, and the other or responsive clutch plate is driven by the powered clutch plate through the stepper member 16. For the purpose of a specific illustration, the first clutch plate 12 is powered or an applied torque is placed on it and the clutch plate 14 is driven though the stepper members 16. The axial force applied to compress the stepper members 16 between the clutch plates is a spring system which may be a single spring or in this embodiment is a plurality of springs in contact with the first clutch plate 12. The axial force of the spring system on the clutch plate 12 determines the desired maximum torque which will be transmitted from the driven clutch plate 12 to the responsive or driven clutch plate 14. When the applied torque to clutch plate 12 is less than the desired maximum torque, the applied torque is transmitted to the clutch plate 14, and each stepper member 16 will not rotate and will maintain the contact elements 26 in the respective and corresponding dimples 20A and 20B. However, when the applied torque exceeds the desired maximum torque, each stepper member 16 will rotate and the elements 26 will move or "step" to the next respective dimples. This "stepping" operation prevents any torque which exceeds the desired maximum torque to be transmitted to the responsive or driven clutch plate 14 and is explained and illustrated in greater detail in FIGS. 1A to 1C.

Figure 1A:
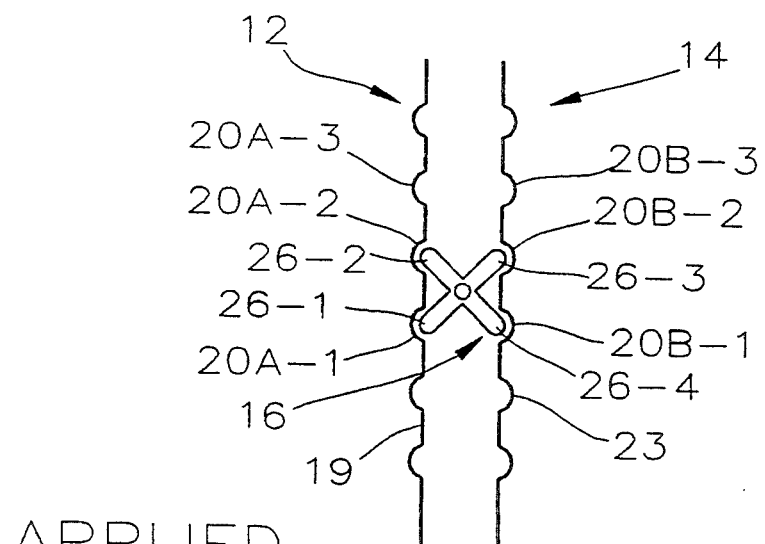
FIGS. 1A, 1B and 1C illustrate the rotation of each stepper member when the desired maximum torque is exceeded and the operation of the stepper member as it rotates between the two clutch plates.
Figure 1B:
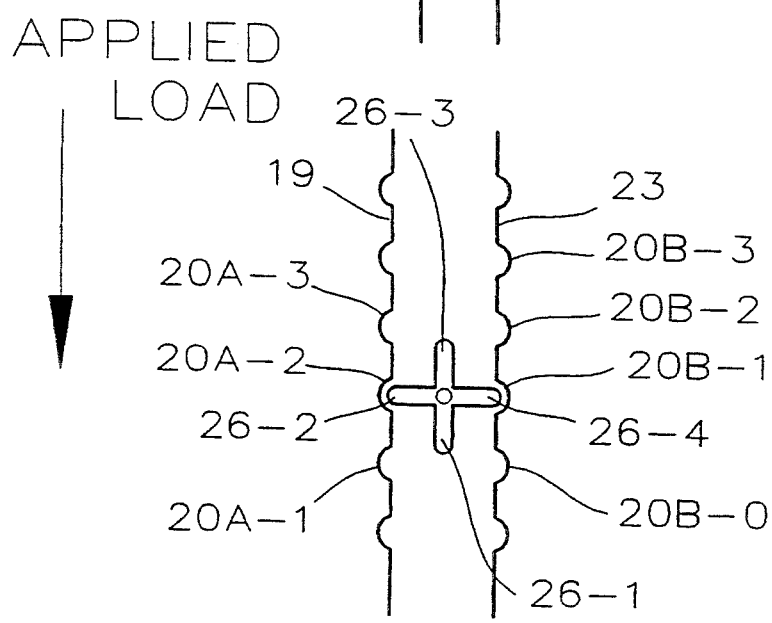
Figure 1C:
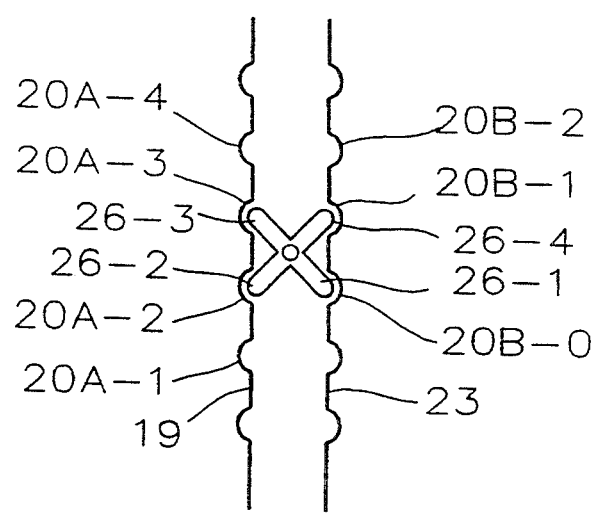

Referring now to FIG. 1A, a stepper member 16 having contact elements 26-1, 26-2, 26-3, and 26-4 is positioned and compressed between face 19 of clutch plate 12 and face 23 of clutch plate 14. The element 26-1 engages dimple 20A-1 and element 26-2 engages dimple 20A-2. The elements 26-3 engages 20B-2 and element 26-4 engages 20B-1. The dimples 20A-1 and 20B-1 are aligned face-to-face or are juxtaposed to each other and remain in this relationship as long as the applied torque on the powered clutch plate 12 does not exceed the desired maximum torque set by the axial force of the spring system which holds stepper member 16 in compression between the two clutch plates 12 and 14. The rotation of or torque on the responsive or second clutch plate 14 is the same as the applied torque on clutch plate 12 in this mode. Once the applied torque provided by a motor or other driving mechanism exceeds the desired maximum torque set by the axial force on clutch plates, each stepper member 16, rather than remaining passively positioned, will rotate and elements 26 of each stepper member 16 will move or "step". When each stepper member 16 begins to rotate, the forces are directed to continuing the rotation of the stepper member 16. During the rotation of the stepper member 16, the clutch plates are moved slightly axially apart. The powered or first clutch plate 12 continues to rotate, the responsive or second clutch plate 14 stops rotating and the stepper member 16 rotates with the contact elements 26-2 and 26-4 remaining in the dimples 20A-2 and 20B-1 respectively. As seen in FIG. 1B, the clutch plate 12 moves away from clutch plate 14. It is noted that the dimples on the faces 19 and 23 do not remain in the same relative relationship but the dimple 20A-2 is now juxtaposed with dimple 20B-1. The excess applied torque from the motor or driving mechanism of clutch plate 12 is thus not transmitted to clutch plate 14. Each stepper member 16 continues to rotate or "step" until contact elements move to the next dimple. The stepper member 16, as shown in FIG. 1C, moves so that the contact element 26-1 is now in dimple 20B-0 of face 23, contact element 26-2 remains in dimple 20A-2, contact element 26-3 is now in dimple 20A-3 and contact element 26-4 remains in dimple 20B-1. It is clearly shown that when the applied torque exceeds the desired maximum torque as set by the axial force compressing the stepper member 16 between the clutch plates, the stepper members 16 is caused to rotate and the excess torque cannot be transmitted to the responsive clutch plate 14. If the applied torque continues to cause clutch plate 12 to rotate and the conditions on clutch plate 14 are not changed to reduce the torque on clutch plate 14 when contact elements 26 are in the new position then the stepper member 16 will continue to "step". The stepping action results in a brief pause in the rotation of each stepper member 16 when an element 26 enters its new position. Because of this pause static friction and not dynamic friction will occur between elements 26 and the clutch plates 12 and 14. Thus the torque which continues the rotation of each stepper member 16 will be the same as that torque when "stepping" first occurred. The "stepping" act ion of each stepper member 16 creates an impact which can be heard or felt, and the applied torque can be removed. The relationship of the two clutch plates 12 and 14 and each stepper member 16 is fully set forth to illustrate that this basic structure may be incorporated in a number of different structures.

By providing a specific structure which will apply a determined axial force to the compression of the stepper members 16 between the clutch plates 12 and 14, the mechanical clutch 10 of the present invention assures that torque exceeding the set or desired maximum torque is not transmitted to the second clutch. The mechanical clutch of the present invent ion has many advantages over clutches known to the art. Some of the advantages are: the high accuracy at which the torque override or non-transmittal of torque can be set; the clutch will limit the same maximum torque applied in either direction; the torque override is the same for dynamic torque as static torque; the mechanical clutch is temperature insensitive; there is instant reset when torque override has occurred; the operation of the mechanical clutch has low heat generation and wear; the torque override can be detectable by a limit switch and/or sound or vibration; and the axial force or load compressing the stepper member can be applied by springs, hydraulics, pneumatics, and/or magnets.

Figure 2:
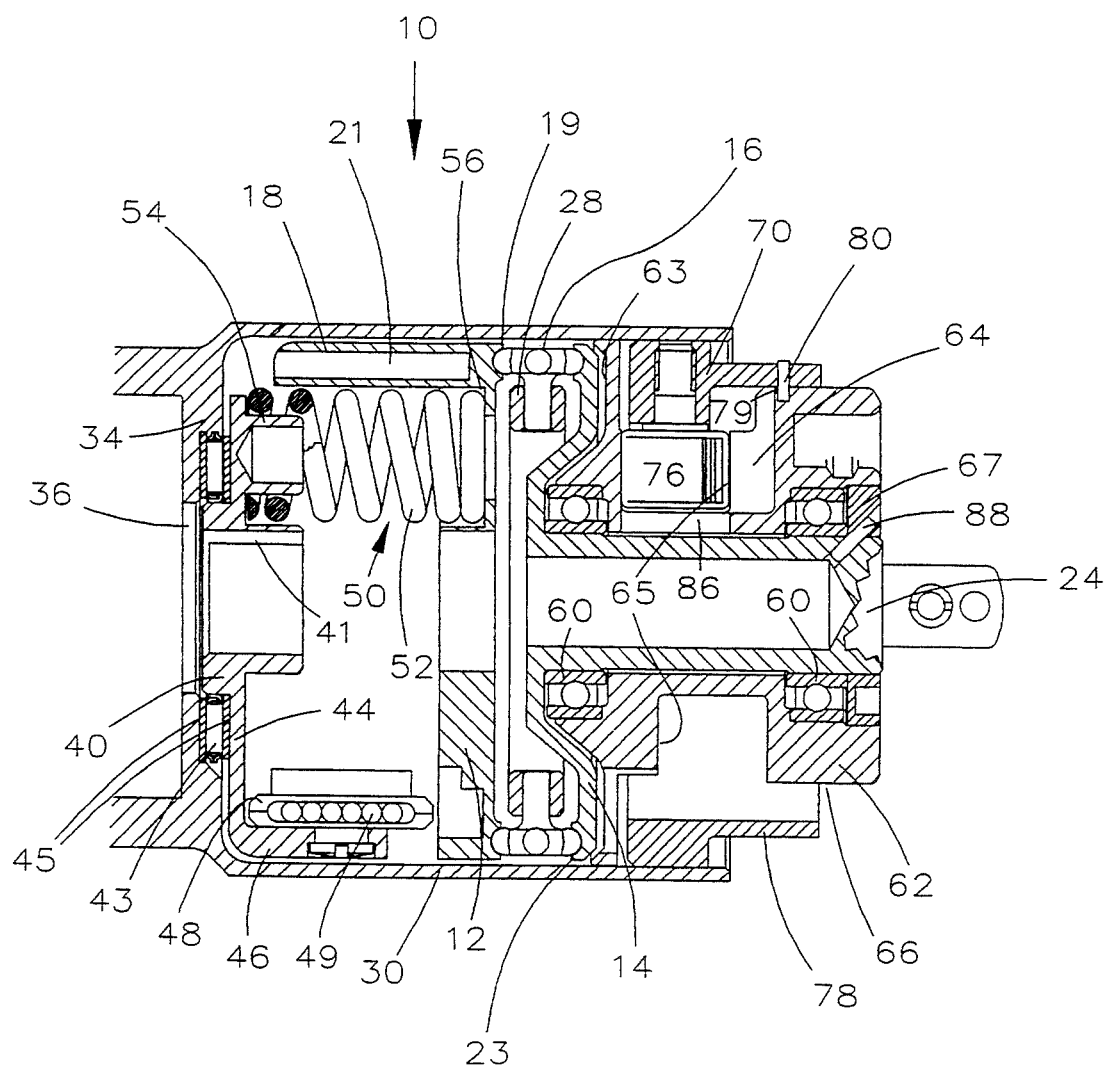
FIG. 2 is a partial cross-sectional view, specifically an assembly drawing, of one embodiment of the mechanical clutch of the present invention, along line X—X of FIG. 4.

Referring now to FIG. 2, the torque limiting mechanical clutch 10, a preferred embodiment of the present invention, includes a first clutch plate 12 and a second clutch plate 14 with a plurality of stepper members 16 equally spaced, axially aligned and engaged between the clutch plates 12 and 14. Clutch 10 is housed within one portion of a clutch housing 30. In this specific embodiment, clutch housing 30 is attached to a motor housing and the motor shaft provides the applied torque (details not shown). A wall 34 divides the two portions of the clutch housing 30 and the wall 34 has an opening 36 large enough for the shaft of the motor to freely pass through. Inside the cylindrical clutch housing 30 is clutch 10. FIG. 2 clearly discloses the various elements of the clutch 10 as assembled in the housing 30 but to describe the details of clutch plate 12 reference is made to the exploded view of clutch 10 illustrated in FIG. 3.

Figure 3:
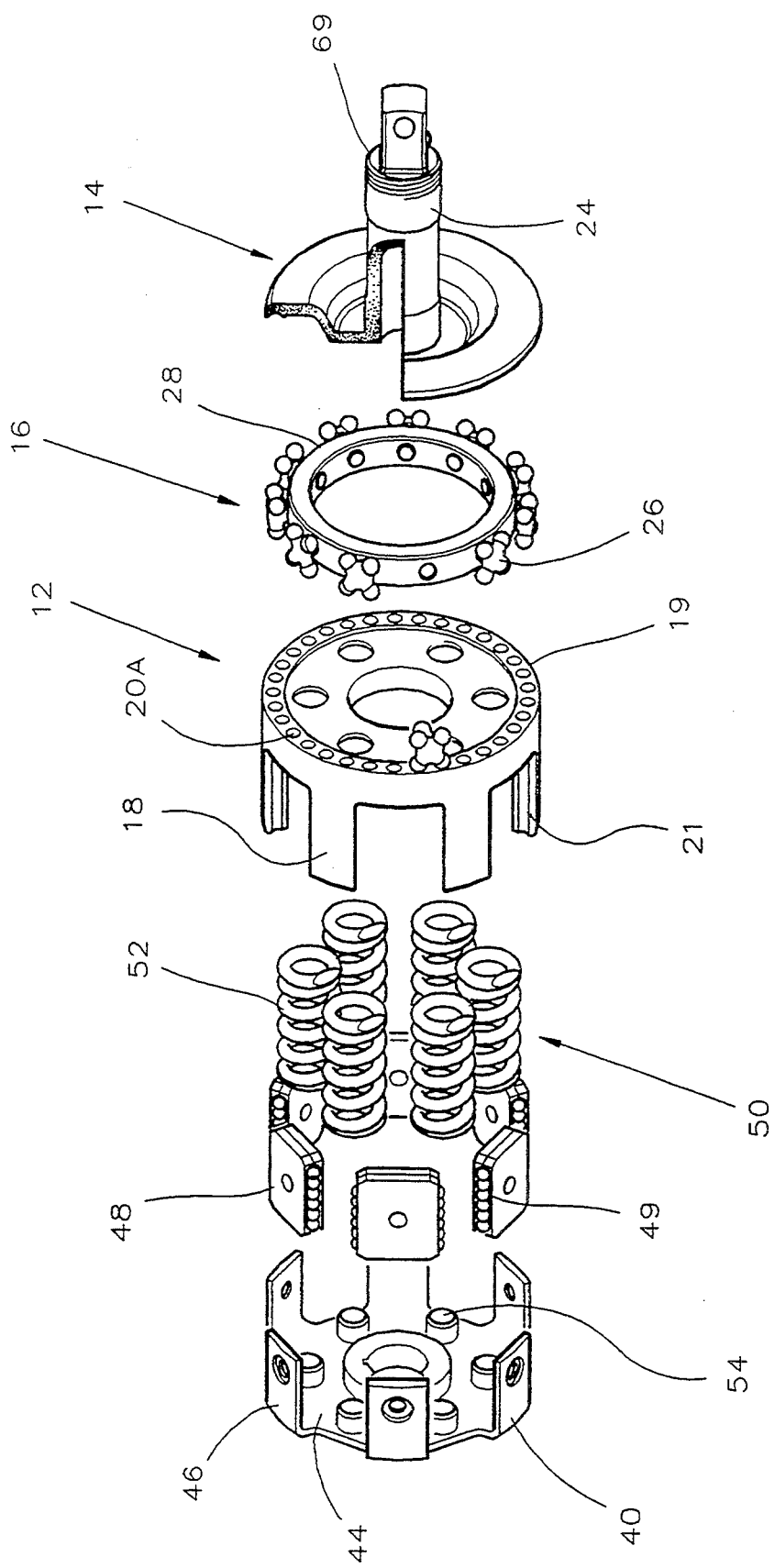
FIG. 3 is an exploded view showing the spring system which provides an axial force on the first clutch plate, stepper members and the second clutch plate of the mechanical clutch of the embodiment of FIG. 2.
Figure 4:
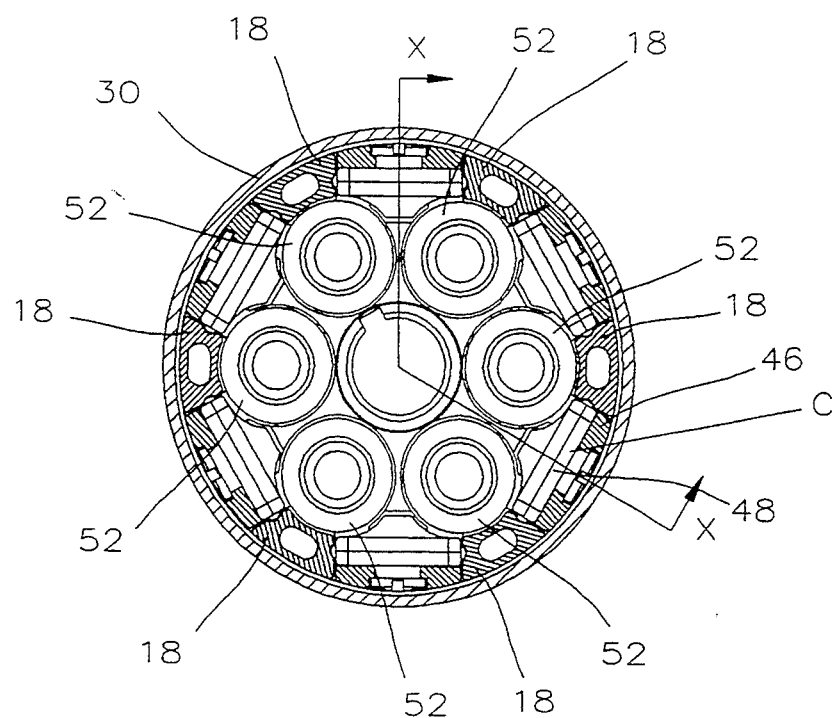
FIG. 4 is a cross-sectional view along line Y—Y of FIG. 7 which shows the relationship between the spring system and the fingers extending from the first clutch plate of the mechanical clutch.

Referring now to FIG. 3, clutch plate 12 (with all elements shown) has a face 19 having a circle of dimples 20A which is driven by clutch driver 40. The clutch driver 40 is keyed to a shaft of a motor by a key (the motor, shaft and key not shown) in a key slot 41 of driver 40. Clutch driver 40 has a base 44 and six perpendicularly extending fingers 46 which each hold a linear bearing 48. Each linear bearing 48 has two fixed races of ball bearings 49, one on each side of the bearing 48. A spring system 50 is mounted to and between the clutch driver 40 and first clutch plate 12. Spring system 50 includes six springs 52 equally spaced in a circle. The clutch driver 40 has a spring alignment pin 54 for securing each spring 52 and the clutch plate 12 has a corresponding opening 56 (see FIG. 2) to hold that spring 52. Alignment pins 54 may be used to secure both ends of a spring 52. The clutch plate 12 has a corresponding number of perpendicularly extending projections or fingers 18 which are spaced to move between the fingers 46 of the clutch driver 40. The six projections 18 of the clutch plate 12 each have grooves 21 in each side surface to contact and provide a race for the ball bearings 49 of the respective linear bearing 48. The clutch driver 40, the spring system 50 and the clutch plate 12 when assembled receive the applied torque from the motor and always rotate together.

Referring to FIG. 2, the second or responsive clutch 14, or output drive, is axially aligned with first clutch plate 12. The clutch plate 14 has a face 23 which has dimples 20B corresponding in number to the dimples 20A in face 19 of clutch plate 12. The clutch plate 14 has a shaft 24 which interfaces with external devices which require an applied torque. The shaft 24 of clutch plate 14 is supported by a pair of roller bearings 60 which surround the shaft 24, one of which is in contact with the back face of the clutch plate 14. A locking interface 62 surrounds the shaft 24 and is positioned between the roller bearings 60. The locking interface 62 is indirectly secured to the housing 30; however, how the locking interface 62 is secured or held in fixed relation to the housing 30 will be described in more detail hereinafter. The locking interface 62 at one end has a face 63 which mirrors the shape of the shaft side of clutch plate 14 and which has a diameter which slightly exceeds that of clutch plate 14. It is preferred for the embodiment used in space to have a number of opening in this face to reduce the total weight of the limiting torque or mechanical clutch. The central body 64 of locking interface 62 has a reduced diameter and in the outer surface of the central body 64 is at least one helical cam surface 65. In a preferred embodiment, there are two helical surfaces, each starting at the same point on the central body 64 but 180° apart, each having a rotation of about 150° and an axial travel of about 0.2". The amplitude of the helix and the rotation thereof will determine the fineness of adjustment of the pre-compression forces placed on the spring system 50 or the axial force on the clutch plates. The end of the locking interface 62 furthest from the clutch plate 14 has a shape having highs and lows (see FIG. 5). A pinned bearing nut 67 threaded to shaft 24 by threads 69 (see FIG. 3) holds the second roller bearing 60 in place surrounding shaft 24.

Figure 5:
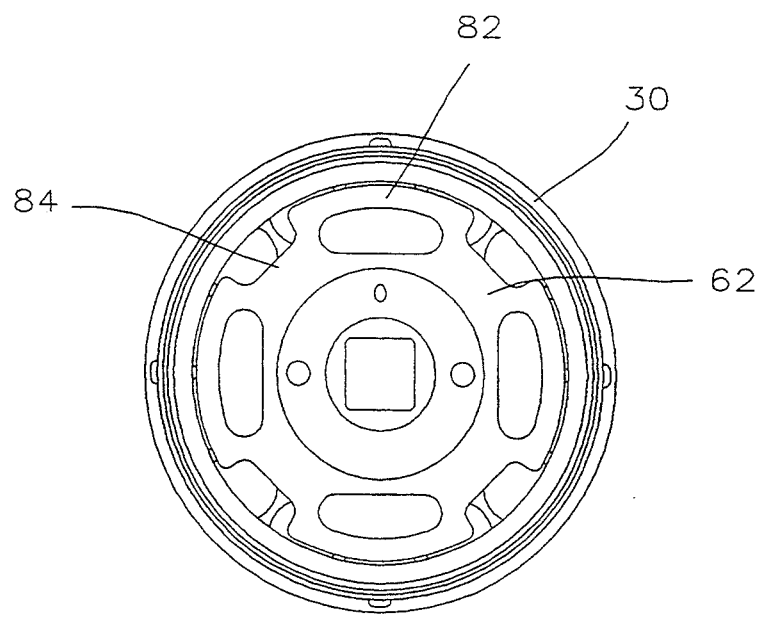
FIG. 5 is an end view of the embodiment of the mechanical clutch of FIGS. 2 and 3.
Figure 6:
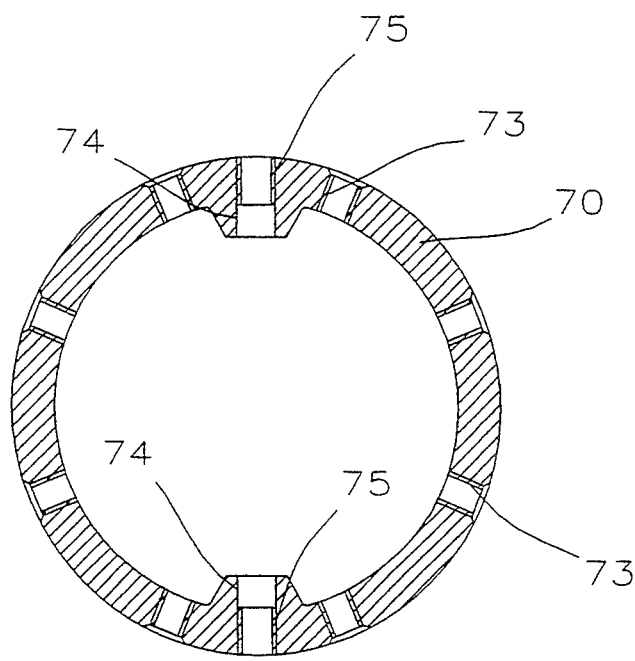
FIG. 6 is a cross-sectional view of the cam follower mount of the embodiment of the mechanical clutch of FIGS. 2 and 3.
Figure 7:
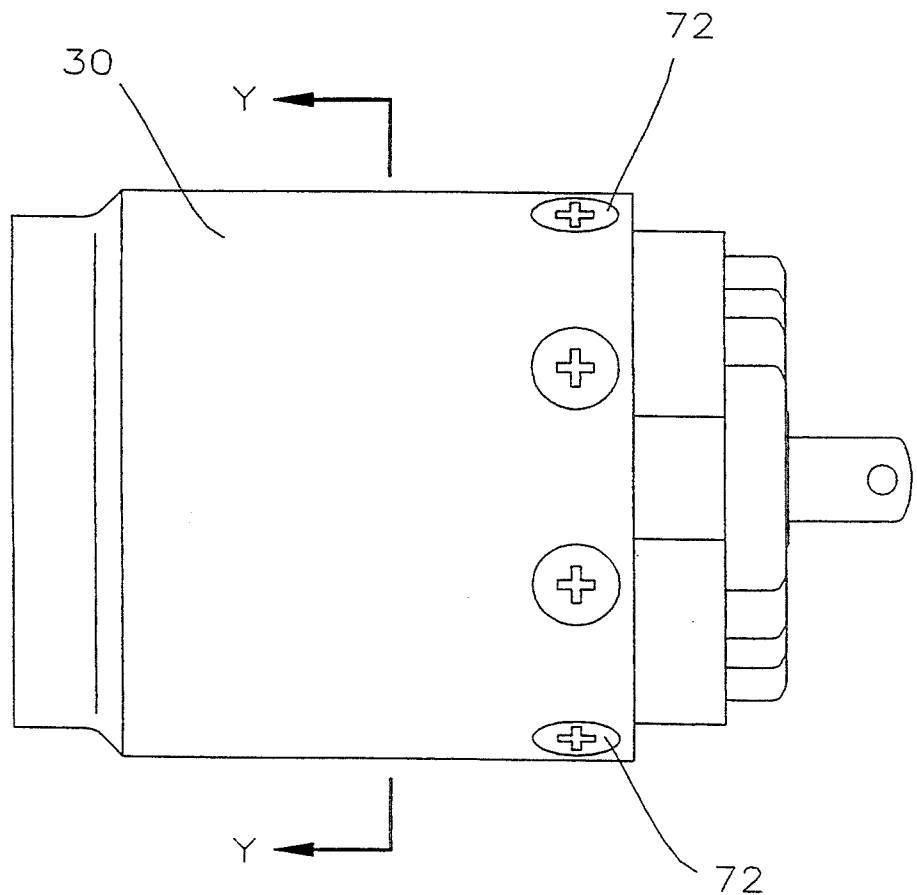
FIG. 7 is a side view of the clutch housing of the embodiment of the mechanical clutch of FIGS. 2 and 3.

A cam follower mount 70 is positioned outside the central body 64 of locking interface 62 (see FIG. 6 and FIG. 2). The cam follower mount 70 is in the form of a ring attached to clutch housing 30, such as by countersunk bolts 72 (see FIG. 7). While only one ring of bolts is shown, it is understood that more than one ring of openings for the bolts may be possible so that the cam follower mount 70 may be positioned within the housing 30 at more than one fixed position. The cam follower mount 70 may be attached to the clutch housing 30 in other ways such as threads. Cam rollers 76 are held relative to the helical cam surface 65 by the cam follower mount 70. The cam rollers 76 are threaded into enlarged portions 74 (see FIG. 6) of the cam follower mount 70 which are faced and have threads 75 (see FIG. 6). The cam rollers 76 rotate around their axis, the axis being the centerline of the cam roller 76 as shown in FIG. 2. Contact of the cam rollers 76 is with the helical side surfaces 65. The cam rollers 76 rotate and move within the helical surfaces 65 as the locking interface 62 is rotated clockwise into the housing 30 (toward the left as shown in FIG. 2) or in other words, the more the locking interface 62 is rotated clockwise, the greater the compression on the spring system 50 and accordingly the greater axial force on the clutch plates, and therefore the greater the maximum torque transmitted between clutch plates. The cam follower mount 70 has a protruding larger diameter ring 78 which extends or protrudes from the back side of cam follower mount 70 at least to cover a portion of the rear end 66 of locking interface 62. The rear end 66 of locking interface 66 is not cylindrical but has highs and lows (see FIG. 5) which have a series of openings 79 in the highs. The ring 78 extending from cam follower mount 70 has at least one opening and pin 80 which is inserted into a desired opening 79 to hold the locking interface 62 at a desired position and will then set a desired axial force on the clutch plates. The openings 79 are on a helical line spaced on a high of end 66 of locking interface 62. When a desired position is chosen, a limited, maximum torque will be transmitted between clutch plates. It is understood that the pin and opening combination is a simplified arrangement for locking the locking interface 62 to the housing 30 at a desired position to provide the desired force on the spring system 50. Other simpler or more complex arrangements can be used to provide the desired positioning of the locking interface 62 within the housing 30. It is restated for clear understanding, that the further into the housing 30 the locking interface 62 is positioned, the greater is the maximum torque that will be transmitted between clutch plates.

Figure 9:
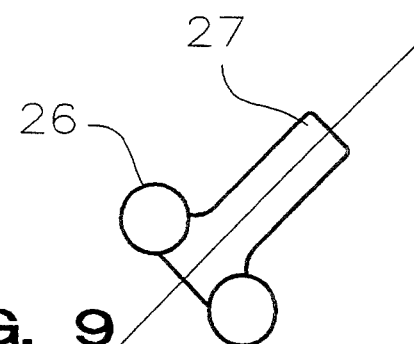
FIG. 9 is an auxiliary view of the stepper member.
Figure 8:
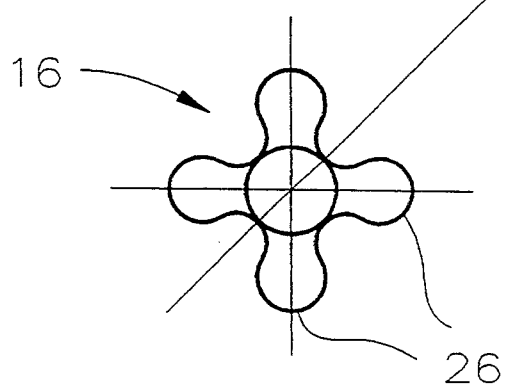
FIG. 8 is an end view of a preferred embodiment of a stepper member.
Figure 10:
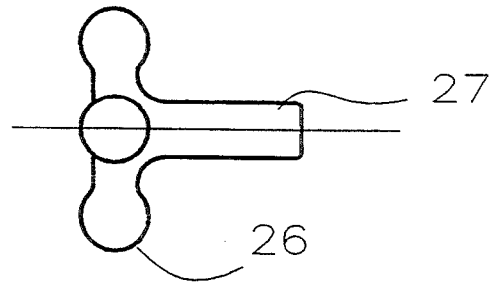
FIG. 10 is a side view of the stepper member.
Figure 11:
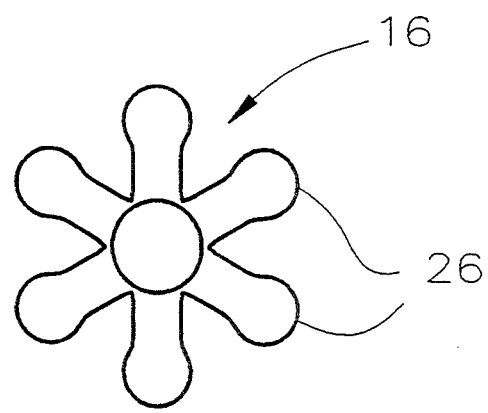
FIG. 11 is an end view of another embodiment of a stepper member.

Referring to FIG. 2, between clutch plate 12 and clutch plate 14 are a plurality of stepper members 16. Each stepper member 16 has one end having four contact surfaces 26. As shown in FIGS. 8, 9 and 10, the preferred stepper member 16 has four contact elements 26, each spaced at 90° from one another. Each contact element 26 is spherical and provides a full spherical surface for each dimple 20A or 20B. Each stepper member 16 has a stabilizing leg 27 which is perpendicular to the contact elements 26 which also terminates in a spherical shape. In the preferred embodiment of FIGS. 2 through 10, there are eleven (11) stepper members 16 and each stepper member 16 has a stabilizing leg 27 which is maintained loosely in a stabilizing ring 28 (see FIGS. 2 and 3). The stabilizing ring 28 will maintain the stepper members 16 in an orientation such that the stabilizing leg 27 of each stepper member 16 is in the same plane when placed between the clutch plates 12 and 14; however, each stepper member 16 can be moved and rotated within the stabilizing ring 28 such that the contact elements are placed initially in the desired dimples. In operation, the ring 28 mainly centers the stepper member 16 between the clutch plates, adds stability and greater unity of action of each stepper member 16. The stepper members 16 are not limited to having four contact elements 26; the stepper member 16 may have at least three contact elements 26 and another specific embodiment has six contact elements 26 (see FIG. 9).

The mechanical clutch 10 is assembled in the clutch housing 30 by first placing a needle thrust bearings 43, having a thrust washer 45 on each side of the bearing and providing the bearing surface for the bearing 43, against the wall 34 of clutch housing 30 (see FIG. 2). The linear bearings 48 are attached to the fingers 46 of the clutch driver 40 and the assembled clutch driver 40 is then placed in contact with a thrust washer 45 and needle thrust bearing 43, which minimizes the friction of rotation between the clutch driver 40 and the wall 34 of the clutch housing 30. A key is inserted into slot 41 to attach and secure the clutch driver 40 to the shaft of a motor (not shown in detail) which is positioned on the other side of wall 34. The six springs 52 are each placed on an alignment pin 54 of clutch driver 40. The clutch plate 12 is then placed in the housing 30, turning the clutch plate 12 so that each finger 18 is aligned between two linear bearings 48, the ball bearings 49 are in the races 21 of fingers 18 and the springs 52 are positioned in the openings 56 on the side opposite the face 19.

The stepper members 16 are preassembled in a stabilizing ring 28 and each stepper member oriented in the ring 28 to provide two contact surfaces 26 to be placed into the dimples 20A in the face 19 of clutch plate 12. The stabilizing ring 28 containing the stepper members 16 is then placed in the clutch housing 30 with two of the contact surfaces 26 of each stepper member in a dimple 20-A and a space between each stepper member 16.

The clutch plate 14 is partially assembled with other elements which will be described in detail hereinafter before being placed into the clutch housing 30. First, the cam follower mount 70 is assembled outside the central body 64 of locking interface 62, sliding the mount 70 over the end 66 of locking interface 62. Referring to FIG. 5, the end 66 has a configuration of four highs 82 and four lows 84. The cam follower mount 70 with the enlarged portions 74 fit over the end 66 of the locking interface 62 at the lows 84, there being four and at 90° from each other such that the two enlarged portions 74 at 180° easily pass over the end 66. A cam roller 76 is inserted into the opening 86 of the central body 64 of the locking interface 62 and after being screwed into the enlarged portion 74 of the cam follower mount 70 becomes positioned in the respective helical cam surface 65. At least two cam rollers 76 are preferred; however, a single roller may be employed.

The first roller bearing 60 is placed on shaft 24 and positioned behind clutch plate 14. The locking interface 62 which has the cam follower 70 and the cam roller 76 already in place are slid onto shaft 24 behind the first roller bearing 60. The second roller bearing 60 is then slid onto shaft 24 and the assembled pieces are held by bearing nut 67 which is threaded to the shaft 24 by threads 69. The bearing nut 67 is held in place by pin 88. The clutch plate 14, the locking interface 62 and the cam follower 70, now assembled, are placed into the clutch housing 30. In placing the clutch plate 14 in the clutch housing 30 there are two alignments which are made: the first is the alignment of the dimples 20-B with the contact surfaces 26 of stepper members 16 which is a simple rotation, if necessary, of the shaft 24 to make certain that the contact surfaces 26 are in the dimples 20-B of the clutch plate 14; and the second is pushing the assembly into the housing 30 sufficiently to align the cam follower ring 70 with the openings in the housing 30 such that the bolts 72 may be inserted through the clutch body 30 and into the threaded opening 73 of the cam follower ring 70. The bolting of the cam follower ring 70 to the clutch housing 30 completes the assembly of the clutch plate 14 in the housing 30 and will provide a pre-compression of or set the loading on the spring system 50 or set a maximum torque to be transmitted from the clutch plate 12 to the clutch plate 14. However, in the preferred embodiment, there is not only a single setting of the axial force or load on the clutch plates or gross setting but the helical cam surface and cam roller provides a fine adjustment to the axial force or load on the clutch plates. To make the fine adjustment of the axial force or load, the locking interface 62 is rotated clockwise which moves the second clutch plate 14 further forward into the clutch housing 30 which pre-compresses the spring system 50 so as to place greater axial force on each stepper member 16 between the clutch plates 12 and 14. The load can be increased in increments as the locking interface 62 is rotated further and the second clutch plate 14 is forced further into the housing 30. When the desired axial force for the desired maximum torque is obtained, pin 80 is inserted into an opening 79 in one of the highs 82 of end 66 of the locking interface 62. There are other ways in which the locking interface 62 may be locked and prevented to rotate once the desired force is set on the spring system 50. The pin 80 is shown in a single opening 79, however, the pin 80 may have a head and a slightly smaller diameter than the diameter of the opening 79 so that it may be easily removed and placed in a different openings making the maximum torque which is transmitted completely adjustable. It is therefore understood that the same complete tool, i.e. the motor and mechanical clutch 10, may be used to perform more than one task with a different maximum torque for each task.

The mechanical clutch 10 of the present invention has a special interest as the structure for a torque limiting power tool to be used in space to assemble or disassemble a space station or sub-assemblies. In such situations it is very essential that the torque on a nut, for example, does not exceed its design specification or the threads may be stripped or the pieces being bolted together may be broken. In a space task such an error could very costly. The mechanical clutch of the present invention minimizes the influence of frictional coefficient changes which occur in space. The mechanical clutch 10, for example, may have the shaft 24 connected to a socket which will provide a torque to a nut or bolt but will not exceed a desired or fixed torque. There are many applications on earth where the torque limiting mechanical clutch 10 may be used, such as in assembling an automobile by robotics. The size and weight of the clutch 10 is such that it can be hand held and thus has many applications such as a tool for changing a tire on an automobile or a bicycle.

We claim:

1. A mechanical clutch assembly comprising:

first means including a first clutch plate which rotates around an axis and having a first face and second face, said second face of said clutch plate having a circle of equally spaced dimples;

second means including a second clutch plate which rotates around said axis and having a first face and second face, said first face of said second clutch plate being in face-to-face relation to said second face of said first clutch plate and having an identical circle of equally spaced dimples;

means interposed between said first clutch plate and said second clutch plate including one or more stepper members each having a plurality of equally spaced contact elements which are compressed and fit within corresponding dimples of said first and second clutch plate;

means for applying an axial force to compress said stepper member between said clutch plates;

means for applying a torque to one of said clutch plates and the other clutch plate being responsive to said one clutch plate; and each stepper member operating in (i) a first mode when the applied torque is less than or equal to the maximum torque threshold due to the axial force on said clutch plates wherein said stepper member remains in the corresponding dimples and the torque from one clutch plate is transferred to the other clutch plate and (ii) a second mode when the applied torque is greater than the maximum torque threshold due to the axial force on said clutch plates wherein said stepper member rotates and elements of each stepper member move to the next dimple which prevents said greater torque from being transmitted to the responsive other clutch plate.

2. A mechanical clutch assembly according to claim 1 which further includes
means for adjusting the axial force which imparts an axial load on each stepper member.

3. A mechanical clutch assembly according to claim 1 wherein said means for applying said axial force is a compression spring system.

4. A mechanical clutch assembly according to claim 2 wherein said means for adjusting the axial force includes a compression spring system and at least one cam roller in a helical race.

5. A torque limiting tool comprising:
a housing;
a mechanical clutch within said housing comprising:
first means including a first clutch plate which rotates around an axis and having a first face and second face, said clutch plate variably positioned axially, said second face of said clutch plate having a circle of equally spaced dimples;
second means including a second clutch plate which rotates around said axis and having a first face and second face, said first face of said second clutch plate being in face-to-face relation to said second face of said first clutch plate and having an identical circle of equally spaced dimples;
means interposed between said first clutch plate and said second clutch plate including one or more stepper members each having a plurality of equally spaced contact elements which are compressed and fit within corresponding dimples of said first and second clutch plate;
means for applying an axial force to compress said stepper member between said clutch plates;
means for applying torque to one of said clutch plates and said second clutch plate being responsive to said first clutch plate; and
each stepper member operating in (i) a first mode when the applied torque is less than or equal to the maximum torque threshold due to the axial force compressing said stepper member wherein said stepper member remains in the corresponding dimples and the torque from one clutch plate is transferred to the other clutch plate and (ii) a second mode when the applied torque is greater than the maximum torque threshold due to the axial force compressing said stepper member wherein said stepper member rotates and elements of each stepper member move to the next dimple which prevents said greater torque from being transmitted to the responsive second clutch plate.

6. A torque limiting tool according to claim 5 which further includes
means for adjusting the axial force compressing said stepper member.

7. A torque limiting tool according to claim 5 wherein said means for adjusting the axial force includes a compression spring system.

8. A torque limiting tool according to claim 6 wherein said means for adjusting the axial force includes a compression spring system and a cam roller in a helical cam surface.

9. A torque limiting tool according to claim 6 wherein said means for adjusting the axial force includes a spring system, a locking assembly having a helical cam surface on a reduced diameter surface thereof, a cam follower mount attached to said housing and a cam roller attached to said cam follower mount and rotatable in said helical cam surface of said locking assembly.

10. A torque limiting tool comprising:
a housing;
a mechanical clutch within said housing comprising:
first rotatable means including a first clutch plate which rotates around an axis and having a first face and second face, said clutch plate variably positioned axially, said second face of said clutch plate having a circle of equally spaced dimples;
second means including a second clutch plate which rotates around said axis and having a first face and second face, said first face of said second clutch plate being in face-to-face relation to said second face of said first clutch plate and having an identical circle of equally spaced dimples;
means for applying an axial force including a spring system which is contact with said first clutch plate and a locking assembly in contact with said second clutch plate;
means attached to said first means for providing an applied torque to said first clutch plate and said second clutch plate being responsive to said first clutch plate; and
means interposed between said first clutch plate and said second clutch plate including one or more stepper members each having a plurality of equally spaced contact elements which are compressed and fit within corresponding dimples of said first and second clutch plate, each stepper member operating in (i) a first mode when said applied torque is less than or equal to the maximum torque threshold due to the axial force on said stepper member wherein said stepper member remains in the corresponding dimples and the torque from said first clutch plate is transferred to said second clutch plate and (ii) a second mode when said applied torque is greater than the maximum torque threshold due to the axial force on said stepper member wherein said stepper member rotates and elements of each stepper member move to the next dimple which prevents said greater torque from being transmitted to the responsive second clutch plate.

11. A torque limiting tool according to claim 10 wherein said first means further includes a clutch driver and said spring system consists of a plurality of springs.

12. A torque limiting tool according to claim 11 wherein said clutch driver has a plurality of protrusions and said first clutch plate has a plurality of fingers which are spaced to move between said protrusions, and said clutch driver and first clutch plate providing the surfaces against which said spring system is compressed.

13. A torque limiting tool according to claim 12 which further includes a plurality of linear bearings mounted on said protrusions of said clutch driver which provide a bearing surface for said fingers of said first clutch plate and eliminates most friction when said first clutch plate is variably positioned axially.

* * * * *